July 2, 1968 B. L. FRESCURA 3,391,023

DIELECTRIC ISOLATION PROCESS

Filed March 29, 1965 3 Sheets-Sheet 1

BERT L. FRESCURA

INVENTOR.

BY Roger S. Borovoy

Stuart Lubitz

ATTORNEYS

BERT L. FRESCURA
INVENTOR.

BY Roger S. Borovoy
Stuart Lubitz
ATTORNEYS

July 2, 1968 B. L. FRESCURA 3,391,023

DIELECTRIC ISOLATION PROCESS

Filed March 29, 1965 3 Sheets-Sheet 3

BERT L. FRESCURA
*INVENTOR.*

BY Roger S. Borovoy
Stuart Lubitz
ATTORNEYS

United States Patent Office

3,391,023
Patented July 2, 1968

3,391,023
DIELECTRIC ISOLATION PROCESS
Bert L. Frescura, Mountain View, Calif., assignor to Fairchild Camera and Instrument Corporation, Syosset, N.Y., a corporation of Delaware
Filed Mar. 29, 1965, Ser. No. 443,461
11 Claims. (Cl. 117—212)

ABSTRACT OF THE DISCLOSURE

A planar semiconductor structure comprising a plurality of dielectrically isolated pockets of semiconductor material suitable for forming circuit elements therein, such as diodes, transistors, and resistors. Throughout the fabrication process, the upper surface is kept free of any contamination, thereby ensuring high reliability and superior electrical characteristics of elements subsequently formed in the device.

Figure 1A:
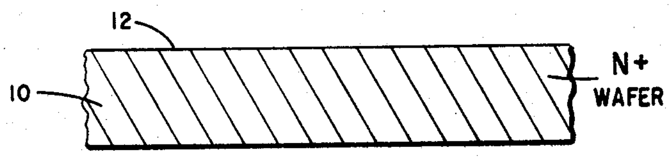

This invention relates to a semiconductor wafer in particular a wafer having semiconductor regions separated by a dielectric, and the process for forming such a wafer.

There are a number of prior art arrangements for isolating the discrete components of an integrated circuit. One of the most commonly employed is the back-biased PN junction interposed between discrete components. Such a junction generally represents a very high impedance between the components, thereby effectively isolating them. However, at high frequencies the capacitive reactance of the PN junction decreases and the capacitive coupling by the junction becomes significant. This results in a deterioration of the effectiveness of the isolation.

Other prior art isolation arrangements have employed thermal oxidation, etching, or dielectric isolation. More recently processes combining these techniques have been developed. One such process is shown in U.S. Patent 3,158,788 issued to J. T. Last on Nov. 24, 1964, and assigned to the assignee of this invention. Another more recently developed process comprises etching one surface of a monocrystalline semiconductor substrate to form a plurality of annular regions, depositing or growing a dielectric in the annular regions, epitaxially growing a polycrystalline support over the dielectric, and then lapping or mechanically polishing the other surface of the monocrystalline semiconductor substrate so that the dielectric extends through the substrate. This process has the disadvantage that the lapping step must be a very precise machining operation requiring tolerances such as plus or minus five microns. In addition, this process is sensitive to any warpage in the semiconductor wafer occurring during the deposition of the polycrystalline layer.

To provide an isolation arrangement that is effective at high and low frequencies and to overcome other disadvantages of the prior art processes, an improved wafer construction and process for making such a wafer has been invented. Briefly, the improved wafer comprises a first support layer, a substantially planar layer of protective material adjacent to the support layer, a layer of monocrystalline semiconductor adjacent the layer of protective material, a layer of dielectric or insulating material adjacent the layer of semiconductor material and formed to separate the layer of semiconductor material into a plurality of separate and discrete regions, and a support layer adjacent the layer of insulating material. This construction enables integrated circuits to be readily formed by first removing the first support layer and then forming the desired components in the monocrystalline semiconductor regions separated by insulation.

The above described wafer construction provides a support surface on both sides of the wafer which protects the remainder of the wafer structure. The protective material is exposed to protect the semi-conductor regions during the removal of the first support layer. Afterwards, the protective material may continue to protect the semiconductor regions from environmental contaminants; still later, after appropriate photo-engraving, it may serve as a mask.

Broadly, the invented process comprises, forming a support layer in supporting relationship to a semiconductor wafer and selectively removing portions of the semiconductor wafer so that separated semiconductor regions are formed. This broad aspect of the invention provides a support for the separated semiconductor regions while they are isolated and connected to a final substrate. Thus, the invention facilitates handling and tends to improve the process yield. In addition to this broad aspect of the invention, a layer of protective material is formed over the semiconductor material prior to forming the support layer. The addition of this intermediate layer of protective material enables the semiconductor etching to be readily controlled by employing an etchant that removes the semiconductor material but does not react with the protective material. The protective material also enables the support layer to be removed after the insulating material and final substrate are formed without affecting the original surface of the semiconductor material. It should also be noted that the presence of a support layer prior to etching enables the removal of an annular region that essentially extends through the semiconductor material to the protective material (or in absence of the protective material to the support layer). This enables the critical lapping and polishing operation of prior art processes to be eliminated, thereby resulting in a cost reduction and improved quality by minimizing warpage.

Figure 1B:
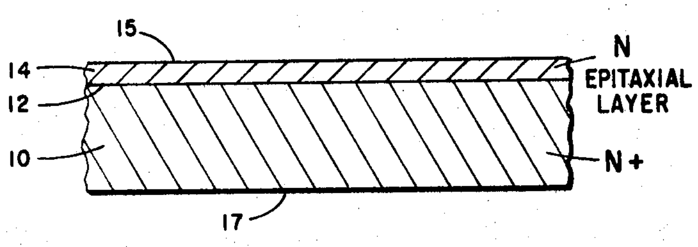

Other advantages, such as the availability of a smooth surface for forming a particular mask, easy integration of epitaxial transistors, and good epitaxial thickness control over the semiconductor layer will be fully understood and appreciated when the detailed description which follows is read in conjunction with the FIGS. 1*a*–1*b* which show in detail the various steps of the process of the invention. It should be understood that in some instances various steps which have been illustrated in the figures may be combined or eliminated and in other instances it may be desirable or necessary to include additional steps.

Referring to FIG. 1*a*, the starting material for an integrated circuit is commonly a semiconductor wafer 10 which may typically be silicon containing a P-type or N-type dopant. For purposes of illustration, wafer 10 is heavily doped with an N-type impurity, such as arsenic, antimony, or phosphorus. The heavy dopant concentration (N+) may be imparted during well known crystal growth techniques commonly employed in the transistor art. With surface 12 appropriately cleaned, an epitaxial layer 14 (FIG. 1*b*), is grown on surface 12 by techniques such as those described in U.S. Patents 3,020,132 and 3,089,788. The epitaxial layer 14 has a lower dopant concentration than wafer 10 and consequently a lower conductivity. The thickness of layer 14 may be precisely controlled by well known methods. The combination of N+ wafer 10 and N-type epitaxial layer 14 facilitates the formation of epitaxial transistors in the final integrated circuit. Such transistors will have relatively low saturation resistances and relatively high breakdown voltages. The formation of layer 14 may be accomplished later in the processing but this would not be as advantageous. It should be understood that wafer 10 and the epitaxial layer 14 are generally referred to herein as "semiconductor material." Thus the term should be given a broad meaning to include both single semiconductor regions and multiple semiconductor regions and layers.

Figure 1C:
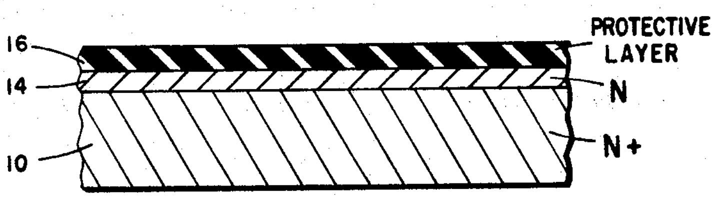

A protective layer 16 of protective material, such as silicon oxide, is next formed over epitaxial layer 14. Layer 16 may be formed by well known planar surface passivation techniques wherein wafer 10 (including epitaxial layer 14) is placed in an oxidizing atmosphere, heated to about 1100° C., and a layer 16 of silicon dioxide is grown over epitaxial layer 14. It is also within the scope of the invention to deposit or apply other protective materials over the epitaxial layer 14. However, it is preferred that wafer 10 and epitaxial layer 14 be monocrystalline silicon and protective material 16 be an oxide of silicon, preferably silicon dioxide (FIG. 1*c*). A silicon dioxide layer, in addition to protecting the surface 14 from environmental contaminants, also serves as a masking material and an etching control during subsequent process steps.

It should be noted that in some prior art processes the etching is performed on the semiconductor wafer 10 without the addition of other layers such as protective layer 16. The etching at this point in a process prevents a useful epitaxial layer 14 from being formed. If the etching in such a process were performed beginning at the surface 15 (FIG. 1*b*) and the insulation then formed on this surface, the layer 14 would not be used for its intended purpose of providing the transistor with a high breakdown voltage. If the etching were begun from surface 17, and then the insulation deposited, the insulation would not effectively separate the regions of layer 14 into discrete areas.

Figure 1D:
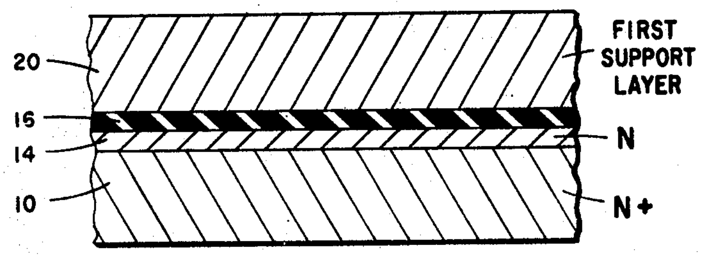

Next, first support layer 20 (FIG. 1*d*) is formed on top of protective layer 16. Support layer 20 provides mechanical strength and rigidity and, in the case of polycrystalline silicon, preferably has a thickness greater than about 100 microns. This thickness is largely dependent on the material employed and available material handling techniques. The support layer 20 may now be formed by vapor deposition, such as growing a layer of polycrystalline semiconductor material upon layer 16 (preferably in an epitaxial reactor), or alternatively by securing the support layer 20 to the epitaxial layer 16 by other methods, such as gluing, bonding, etc. Suitably, polycrystalline silicon may be selected as the semiconductor material for the support layer 20.

Figure 1E:
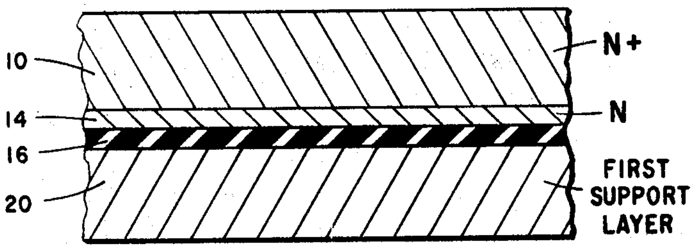
Figure 1F:
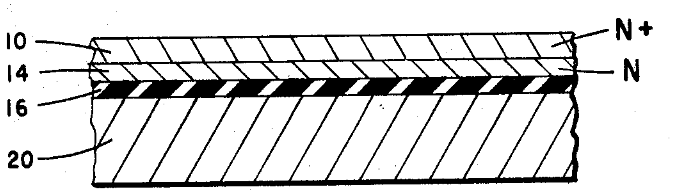
Figure 1G:
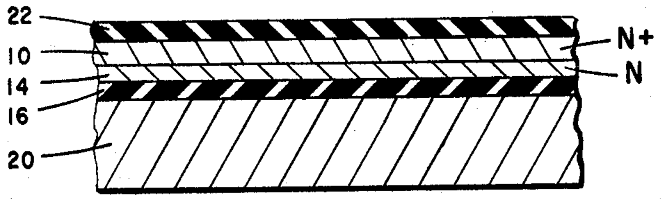

Next, the entire assembly is inverted so that support layer 20 is in a supporting relationship with respect to the other layers, as shown in FIG. 1*e*. With the layers in this relationship, semiconductor wafer 10 may be lapped, etched, polished or any combination of the three to achieve a desired thickness. It should be noted that this is not a particularly critical operation but may be one that is commonly employed to achieve tolerances in the range of $\pm 5$–$10\mu$. Only the thickness of wafer 10 need be adjusted by lapping or the like as layer 14 already has a precise thickness. Once wafer 10 is at the desired thickness (FIG. 1*f*), the assembly is in condition to be formed into regions separated by a dielectric or insulation.

Figure 1H:
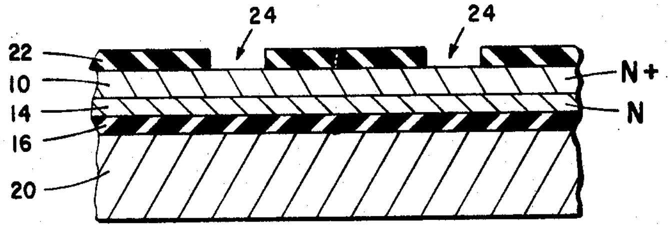
Figure 1I:
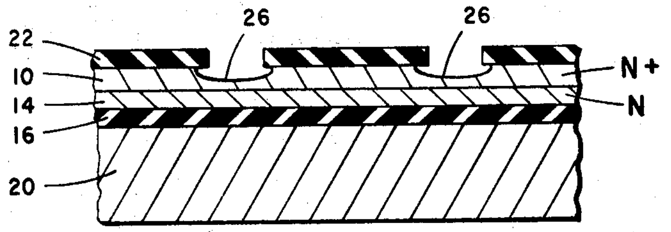

FIGS. 1*g*–1*k* show the method for selectively removing portions of the semiconductor material so that only the first support layer 20 and protective material 16 remain in certain regions of the assembly. This selective removal is accomplished by first forming a layer of masking material 22 (FIG. 1*g*) on top of wafer 10. In the case of a silicon wafer 10, the masking material 22 is preferably silicon dioxide formed as described above. Portions of masking material 22, by well known photoengraving techniques, are selectively removed in regions 24 where the semiconductor material of wafer 10 and layer 14 is to be removed (FIG. 1*h*). In a plan view (not shown), the removed masking material as well as the subsequently removed semiconductor material may take the form of an annular region. As used in this specification, the term annular region should be taken to mean any closed path of a given width. It is relatively unimportant whether this path takes the form of a circle, rectangle, ellipse, or other configuration.

Following the removal of portions of masking material, a conventional etchant, such as "CP–6" is applied to the semiconductor material exposed through openings 24. The etchant is permitted to dissolve a major portion of the underlying semiconductor material, that is, more than about half of the thickness. When this partial etching is completed, the etchant is removed and a structure shown in FIG. 1*i* remains.

Figure 1J:
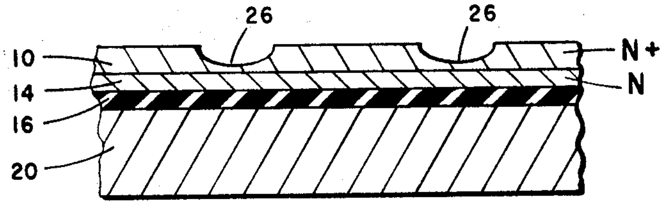

It is undesirable to complete the etching before masking material 22 is removed. The complete etching of the underlying semiconductor material followed by the stripping away of masking material 22 with the forces incident therewith can result in permanent damage to protective layer 16. Thus, after a partial etching of the semiconductor material, such as into wafer 10 only, as shown, the masking material 22 is stripped from the surface of the wafer 10 as shown in FIG. 1*j*.

Figure 1K:
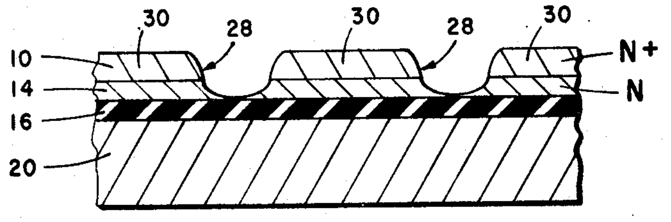

Next, the removal of the annular portions of the semiconductor material is completed by covering the partially etched regions 26 and the adjacent surface of layer 10 with etchant, whereby the annular portions 28 are formed as shown in FIG. 1*k*. The partially etched regions enable the forming of the annular portions 28 to be completed before any substantial portion of the surface of layer 10 is removed. The annular portions 28 extend for all purposes through semiconductor material of wafer 10 and layer 14. The etching may in some instances be stopped prior to reaching the top surface of protective layer 16, but it will not be stopped at a point that would alter the effectiveness of the insulation to be subsequently deposited. The presence of protective material 16 adjacent epitaxial layer 14 serves to control the etching process. The protective material 16 is such that it does not react with the etchant being employed, In this manner the depth of the annular portion is precisely limited by the top surface of protective material 16. It should be noted that since the annular portions extend completely through the semiconductor material of body 10 and layer 14 no subsequent lapping operations are necessary to remove excess semiconductor material and accomplish a complete insulation of the semiconductor regions. The separated semiconductor regions 30 (FIG. 1*k*) are rigidly supported by first support layer 20 to facilitate handling during the subsequent forming of the insulation and final substrate. The overall process of forming regions 30 may be referred to generally as mesa etching.

Figure 1L:
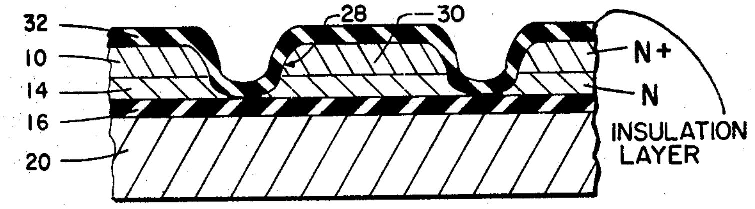

Next, annular portions 28 are filled with an insulating material 32 (FIG. 1*l*). The insulating material 32 is preferably deposited or grown over annular portions 28 and the exposed surface of the wafer 10. In the case of silicon semiconductor material, the insulating material 32 may be formed by a combination of thermal oxidation and pyrolytic deposition such as described in U.S. Patent 3,158,505 issued to J. E. Sandor, on Nov. 24, 1964, and assigned to the same assignee as this invention. An important feature of this insulation surrounds a substantial portion of the separated semiconductor regions 30 while the protective material 16, which may also be an insulating material, surrounds the remaining portion of semiconductor regions 30. Thus, the separated semiconductor regions are completely encapsulated by insulating or dielectric material.

Figure 1M:
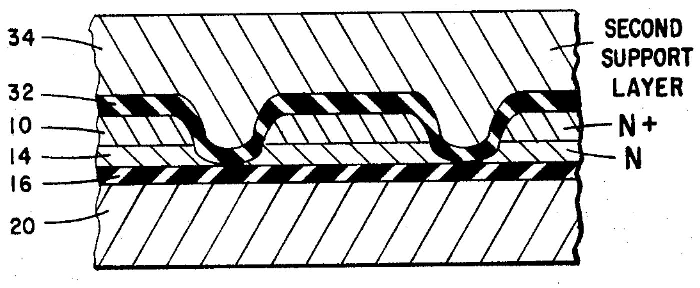
Figure 1N:
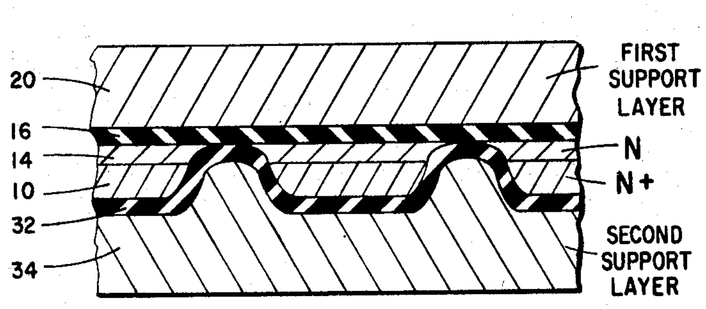

A final substrate, such as the second support layer 34 shown in FIG. 1*m*, is now formed over the insulating material 32. Typically, this second support layer 34 is a polycrystalline semiconductor material formed by epitaxial growth, again resulting in a polycrystalline structure. Once the second support layer 34 is formed, the entire assembly is inverted so that second support layer 34 assumes a supporting relationship with respect to the remainder of the assembly, as shown in FIG. 1*n*.

It can be seen that a composite wafer has now been formed with supporting layers on both sides of the semiconductor body including wafer 10 and layer 14. These support layers securely protect the semiconductor material from environmental contaminants and ease the handling requirements if such is necessary before the completion of the integrated circuit.

Figure 1O:
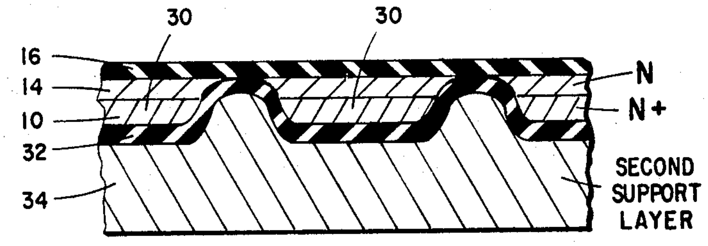
Figure 1P:
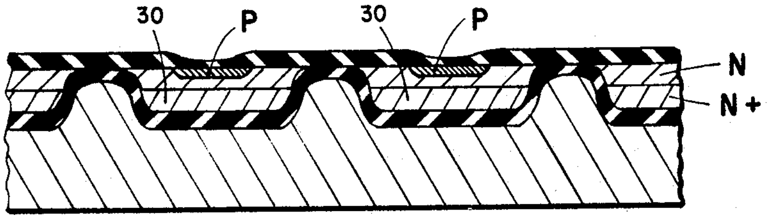

An integrated circuit may be completed (FIGS. 1*o* and 1*p*) by removing first support layer 20 which leaves the second support layer 34 as the sole support for the circuit. The support layer 20 may be removed by application of an appropriate etchant. The protective material 16 protects semiconductor material 10 from the etchant since it is non-reactive with the etchant. The exposed protective material 16 continues to protect the surface of the semiconductor material 10 from environmental contamination after removal of layer 20 and insulates the separated regions 30. The protective material 16, in the case of silicon dioxide, functions as a masking material during the forming of the discrete components in separated regions 30 in accordance with well known planar techniques as described in U.S. Patent 3,025,589, issued to J. A. Hoerni, on Mar. 20, 1962. As shown in FIG. 1*p*, a PN junction may be formed in separated regions 30 by well known diffusion techniques. Further, transistors, MOS devices, or other elements may be diffused into the separated regions 30, as is well known in the art.

In summary, a process has been invented for forming an integrated circuit having semiconductor regions completely separated by insulating material. The invented process accomplishes this manufacture without the need for precise lapping operations that could be sensitive to warpage. The forming of a first support layer before etching minimizes the handling problems during etching and insulation formation. The first support layer cooperates with a second support layer during the latter steps of processing to completely protect the composite wafer that is later to be employed in forming the completed integrated circuit. In addition, the forming of a protective material over the semiconductive material prior to the formation of a support layer enables the removal of the annular portions of the semiconductor to be precisely controlled. The protective material also contributes to the insulation of the separated semiconductor portions, acts as a protective material while the first support layer is being removed, and after it has been removed thus securing the integrity of the surface of the semiconductor wafer 10. The protective material serves as a masking material during the formation of the components of the integrated circuit. The invented process is also consistent with the formation of epitaxial transistors in an integrated circuit that employs dielectric or insulating material isolation. Protective material 16 on the semiconductor wafer 10 and the first support layer 20 over the protective material together provide a smooth surface for forming a particular mask when the first support layer is finally removed. This is especially important where small geometries are used, requiring intimate surface contact of the mask. The insulating material, as well as the other layers and materials, are readily formed consistent with reliable planar techniques.

While the above detailed description has shown the fundamental novel features of the invention as applied to a preferred embodiment, it will be understood that various omissions and substitutions and changes in the form and details of the specific embodiments illustrated may be made by those skilled in the art without departing from the spirit and scope of the invention. It is the intention, therefore, that the scope be limited only as indicated by the following claims.

What is claimed is:

1. A semiconductor body comprising:

a first layer of semiconductor material of a first conductivity type having an upper and a lower surface;

a substantially planar second layer adjacent and adherent to the upper surface of said first layer, said second layer comprising a material that protects said upper surface from unwanted contamination;

a third layer of supporting material adjacent and adherent to the exposed portion of said second layer, said third layer material capable of being easily removed by a substance that will not affect said second layer;

a fourth layer adjacent and adherent to the lower surface of said first layer and formed to separate said first layer into a plurality of separate and distinct regions, said fourth layer comprising a material that provides electrical insulation along the adjacent first layer lower surface;

a fifth layer adjacent and adherent to the exposed portion of said fourth layer and comprising a supporting material, whereby integrated circuits may readily be formed by removing said third layer of supporting material and processing the remaining portion of the wafer.

2. The body recited in claim 1 wherein said first layer of semiconductor material comprises silicon, and said second and fourth layer materials respectively comprise an oxide of silicon.

3. The body recited in claim 1 wherein said first layer semiconductor material is monocrystalline and said third and fifth layers comprise respectively a semiconductor material.

4. The body recited in claim 3 wherein said first layer of semiconductor material comprises monocrystalline silicon, said second and fourth layers comprise respectively silicon dioxide, and said third and fifth layers comprise respectively polycrystalline silicon.

5. The body recited in claim 4 wherein the oxide of silicon in said second layer is suitable for masking.

6. The body recited in claim 5 wherein said fourth layer extends substantially through said first layer to said second layer.

7. The body recited in claim 6 wherein said first layer comprises at least two regions, with one region having a higher impurity concentration than the other.

8. A process for forming a composite semiconductor body having a plurality of semiconductor regions separated by insulation comprising:

forming a first layer of semiconductor material of a first conductivity type having an upper and a lower surface;

forming a substantially planar second layer adjacent and adherent to the upper surface of said first layer, said second layer comprising a material that protects said upper surface from unwanted contamination;

forming a third layer of supporting material adjacent and adherent to the exposed portion of said second layer, said third layer capable of being removed by a substance that will not affect said second layer;

seelctively removing portions of said first layer from the lower surface thereof, the removed portions extending through to said second layer;

forming a fourth layer of insulating material along the lower surface of said first layer including said removed portions, whereby semiconductor regions separated by electrical insulation are formed.

9. The process recited in claim 8 wherein said first layer of semiconductor material is monocrystalline, the step of forming said second layer comprises oxidation, the step of forming said third layer comprises growing a layer of polycrystalline semiconductor material upon said second layer, and, the step of selectively removing portions of said first layer comprises mesa etching with a substance that is non-reactive with said second layer.

10. The process recited in claim 9 including the additional step of forming a fifth layer of supporting material adjacent and adherent to the exposed portion of said fourth layer.

11. The process recited in claim 10 wherein said additional step comprises growing a layer of polycrystalline semiconductor material upon said fourth layer.

References Cited

UNITED STATES PATENTS

| | | | |
|---|---|---|---|
| 3,290,753 | 12/1966 | Chang | 117—212 X |
| 3,025,589 | 3/1962 | Hoerni | 317—235 X |
| 2,958,120 | 11/1960 | Taylor | 156—3 X |

ALFRED L. LEAVITT, *Primary Examiner.*

A. M. GRIMALDI, *Assistant Examiner.*